United States Patent [19]

Okai et al.

[11] Patent Number: 4,513,444
[45] Date of Patent: Apr. 23, 1985

[54] METHOD OF COMPRESSING DATA

[75] Inventors: Tsukasa Okai; Shuichi Araki, both of Kyoto, Japan

[73] Assignee: Dainippon Screen Seizo Kabushiki Kaisha, Japan

[21] Appl. No.: 514,673

[22] Filed: Jul. 18, 1983

[30] Foreign Application Priority Data

Sep. 13, 1982 [JP] Japan ............................... 57-159226

[51] Int. Cl.$^3$ ............................................. G06K 9/36
[52] U.S. Cl. ....................................... 382/56; 382/22; 358/260
[58] Field of Search ....................... 382/21, 22, 60, 54, 382/56; 358/260-262; 340/739, 750, 798, 799; 364/518-521

[56] References Cited

U.S. PATENT DOCUMENTS 4,199,815  4/1980  Kyte et al. ............................ 382/56
4,375,654  3/1983  Evans et al. ......................... 358/260

OTHER PUBLICATIONS

Sklansky et al., "Fast Polygonal Approximation of Digitized Curves", Pattern Recognition, vol. 12, No. 11, 1980, pp. 327-331.

Primary Examiner—Leo H. Boudreau
Assistant Examiner—Michael Murray
Attorney, Agent, or Firm—Hayes, Davis & Soloway

[57] ABSTRACT

Disclosed is a method for compressing data which is derived by tracing the contour line of a character pattern or a symbol. Normally such a contour line consists of at least one closed-loop line having straight portions and curved portions. A multiplicity of sampling points are selected along the contour line for the purpose of representing the contour line with these sampling points and those sampling points located along a straight or lightly curved portion of the contour line are disregarded and those located along a curved portion of the contour line are retained because the former have relatively less influence on the representation of the original character or symbol pattern than the latter. The determination of the significance of each sampling point is typically made by comparing the product of the length of a line segment connecting the sampling point of interest with the preceding sampling point and the angle defined by this line segment and another line segment defined by the sampling point of interest with the following sampling point.

4 Claims, 3 Drawing Figures

METHOD OF COMPRESSING DATA

This invention relates to a method for compressing data of a two-value picture image and, in particular, to a method for compressing digital data for character font in computerized photo-typesetting.

It is widely known to store font sets as a number of dot matrices. But, to accurately represent a complicated character pattern such as that of a kanji (Chinese) character, a considerably dense dot matrix is required.

In computerized type-setting, it is desirable to have various font sets such as Ming-type, gothic and so on, in the case of kanjis, in readily retrievable manner. Since the number of the kinds of kanjis is generally in the order of thousands in common Japanese documents and of tens of thousands in Chinese documents, the necessary size of memory for such application tends to be great. Also, to meet the need for high quality, the bit pattern of each character must be comprised of an extremely dense dot matrix, as opposed to the case of character patterns for common kanji processors for processing Japanese-language documents.

According to a conventional technique, sampling points are appropriately selected along the contour line of a character or a symbol and the X-Y coordinate value of each sampling point is stored as data information of the character or the symbol. However, according to this known technique, there is a need to select a large number of sampling points when there are many curved portions even in the case of a relatively simple character such as "hiragana (Japanese alphabet)" and the volume of the data to be stored amounts to a great deal.

Hence, it is advantageous to vary the density of the sampling points along the contour line, increasing the density when the curvature of the contour line is great and decreasing the density when the contour line is straight or lightly curved, so that the number of the sampling point or the volume of the data to be stored may be reduced without unduly sacrificing the quality of character reproduction. However, selecting proper sampling points according to the curvature of the contour line is by no means easy. It requires a skill and even a skilled worker can not help making errors from time to time in processing a large number of characters and symbols as a tedious procedure.

In view of such inconveniences and disadvantages of the conventional methods for storing the data of character sets, in particular, for kanjis, a primary object of this invention is to provide a method for compressing data in storing the X-Y coordinate values of a large number of sampling points selected along the contour line of a character by selecting sampling points at relatively small intervals in the portions having relatively large curvatures and reducing the number of sampling points in those portions which are straight or lightly curved and have less influence on the quality of reproduced character images.

Another object of this invention is to provide a method for compressing data by automatically determining the necessary sampling points from those which have less significance in accurately reproducing character images.

According to this invention, such objects are accomplished by providing a method of compressing data derived by tracing the contour line of a character or a symbol characterized by the steps of selecting a plurality of sampling points along the contour line, finding the length of a line segment connecting a sampling point of interest and a preceding sampling point, finding the angle defined by the mentioned line segment and a second line segment defined by connecting the mentioned sampling point of interest and the following sampling point, and determining the particular sampling point as necessary data which needs to be retained or as unnecessary data which may be disregarded according to the length of the first line segment and the angle defined by the first and the second line segments.

Now this invention is described in the following with reference made to the appended drawings; in which:

FIG. 1 is a diagram showing a plurality of sampling points selected along a desired contour line in a X-Y coordinate plane. Actually, the contour line of a character forms at least one closed-loop line but here is shown only a portion of such a closed-loop line.

Figure 1:
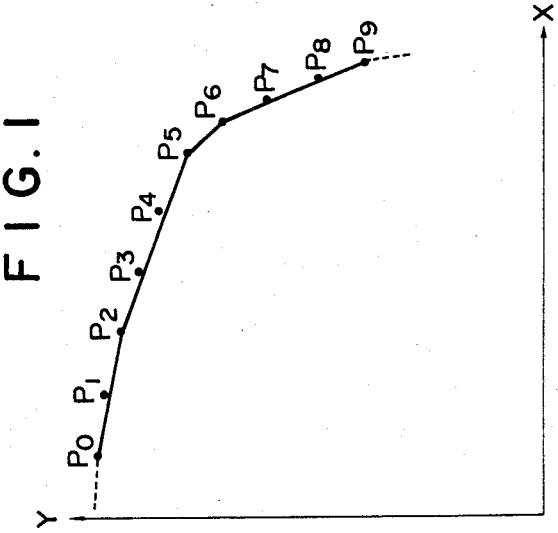
FIG. 1 illustrates how sampling points may be selected along a contour line.

In FIG. 1, points $P_0$ to $P_9$ are sampling points arranged along the graphic contour line as described above. It is possible to produce an accurate reproduction of a picture image if all the data of these sampling points is used and the contour line is expressed by the line segments sequentially connecting these points without any omission. However, doing this will cause the inconvenience that the volume of data to be stored in the memory device becomes excessively great as described previously.

Therefore, in actual work, the contour line is aproximated by line segments connecting sampling points selected at appropriate intervals, disregarding one or more sampling pints each time the line segment is defined. In the example shown in FIG. 1, sampling points $P_1$, $P_3$, $P_4$, $P_7$ and $P_8$ correspond to such disregarded sampling points.

However, where the curvature of the contour line great, the contour line must be expressed according to the data of all the relevant sampling points. In FIG. 1, points $P_5$ and $P_6$ correspond to such sampling points.

In other words, the X-Y coordinate values of the sampling points $P_0$, $P_2$, $P_5$, $P_6$ and $P_9$ are the data which has to be stored in the memory device as necessary information for defining the configuration of the contour line while the coordinate values of the sampling points $P_1$, $P_3$, $P_4$, $P_7$ and $P_8$ are unnecessary information which may be disregarded.

This invention allows automatic and accurate determination of the coordinate values whether they are necessary information or unnecessary information according to the product of the length of the line segment connecting the sampling point of interest with the preceding sampling point and the bending angle between the two line segments behind and ahead of the sampling point of interest.

More specifically, with the length of the line segment connecting sampling points $P_n$ and $P_{n+1}$ and the angle formed by this line segment and the preceding line segment assumed as l and $\theta$, respectively, their product $l\cdot\theta$ is compared with a predetermined constant k, and the coordinate value of the sampling point $P_{n+1}$ is determined as necessary information when $l\cdot\theta > k$ and as unnecessary information when $l\cdot\theta < k$.

When the coordinate value of the point $P_{n+1}$ is determined as unnecessary information, the same procedure is repeated over the next sampling point $P_{n+2}$ in relation with the preceding sampling point $P_n$.

According to the example shown in FIG. 1, with the processing up to point $P_2$ assumed to be finished, l and $\theta$ are obtained from the coordinate values of $P_2$ and $P_3$ and, since l is small as it is the distance between two closely located sampling points and $\theta$ is small as the line segments $P_0P_2$ and $P_2P_3$ form a relatively blunt angle, the product $l\cdot\theta$ is determined to be samller than constant k and the data of the point $P_3$ is determined as unnecessary information.

Next, the same process is repeated with the data of the point $P_3$ replaced by the data of the point $P_4$, and, in this instance, still $l\cdot\theta < k$ and the data of the point $P_4$ is also determined to be unnecessary information.

Then, the processing is repeated with the data of the point $P_4$ replaced by the data of the point $P_5$ and, in this instance, $l\cdot\theta > k$ and the data of the point $P_5$ is determined to be as necessary information. And the coordinate value of the point $P_5$ is stored in the memory device.

When the same processing is repeated over the data of the points $P_5$ and $P_6$, it is determined that $l\cdot > k$ since, in this instance, l is small but the curvature of the contour line is great and $\theta$ is a relatively large value. And the data of the point $P_6$ is determined as necessary information.

As is obvious from the above description, the greater the value of the constant k is, the greater the number of disregarded sampling points becomes, allowing the ratio of data compression to be increased and the necessary memory capacity to be decreased, but, on the other hand, it is unavoidable to suffer some loss in the faithfulness of the reproduced picture image to the original picture image pattern. It is possible to improve the faithfulness by reducing the value of k but at the expense of a greater memory capacity.

Therefore, the value of the constant k should be selected at an appropriate value with the object of the application and the performance of the facilities and equipment fully taken into account.

In the above description, discussion was made with respect to the cases of $l\cdot\theta > k$ and $l\cdot\theta < k$, disregarding the case of $l\cdot\theta = k$, but the last mentioned case does not pose any problem as long as it is determined in advance the data is to be disregarded or not when this condition holds.

Figure 2:
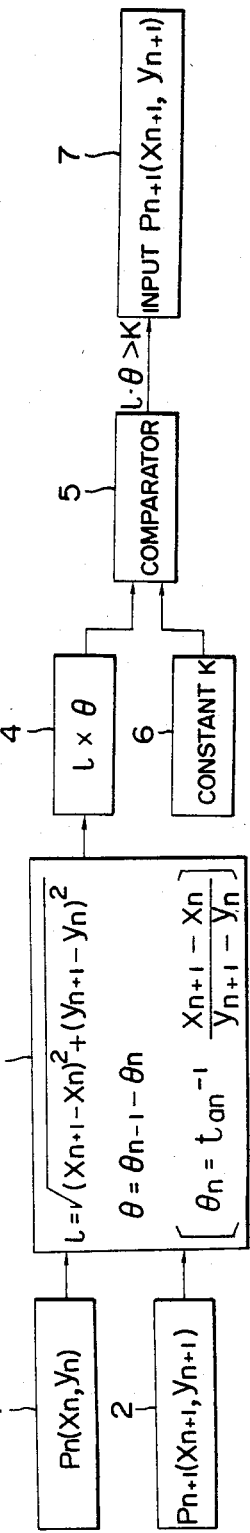
FIG. 2 is a block diagram of a device for carrying out the method of this invention.

FIG. 2 shows a circuit block diagram of a device which is adapted to carry out the method of this invention.

Numerals 1 and 2 denote the input values of the coordinate values $(x_n, y_n)$ and $(x_{n+1}, y_{n+1})$ of sampling points $P_n$ and $P_{n+1}$. These coordinate values may be inputted using a digitizer table, a plotter or the like and, therefore, its detailed description is omitted here.

The input values 1 and 2 are supplied to an arithmetic circuit 3 where the length l of the line segment and the angle $\theta$ between this line segment and the preceding one are calculated according to the following formula.

$$l = \sqrt{(x_{n+1} - x_n)^2 + (y_{n+1} - y_n)^2}$$

$$\theta = \theta_{n-1} - \theta_n$$

where $$\theta_n = \tan^{-1}\frac{x_{n+1} - x_n}{y_{n+1} - y_n}$$

$$\theta_{n-1} = \tan^{-1}\frac{x_n - x_{n-1}}{y_n - y_{n-1}}$$

The output signals l and $\theta$ are converted into product $l\cdot\theta$ thereof at a following multiplication circuit 4 and the product is then compared with the constant k set up in a constant value set-up circuit 6 at a comparator 5.

The comparator 5 supplies an input indication signal to a following data input control device 7 only when $l\cdot\theta > k$. Upon receiving the data input indication signal, the dat input control device 7 stores the coordinate value $(x_{n+1}, y_{n+1})$ of point $P_{n+1}$ in the memory device, and the same process is repeated over the following sampling point.

If $l\cdot\theta < k$, there is no output from the comparator 5 and the coordinate value of point $P_{n+1}$ is disregarded as unnecesary information, followed by the same procedure repeated again with the suffix $n+1$ replaced by $n+2$.

Figure 3:
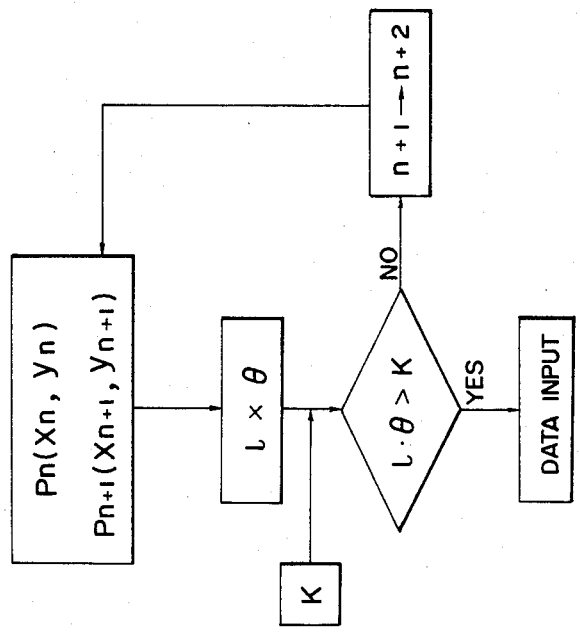
FIG. 3 is a flow diagram showing the action of the device of FIG. 2.

The flow diagram of FIG. 3 illustrates this process.

As described above, the method of this invention allows automatic and accurate determination of necessary and unnecessary information with regard to the coordinate value of each of the sampling points arranged along the contour line and storing only the necessary information of a character, a symbol or the like in a memory device, and has a great significance in practical applications.

As will be evident to those skilled in the art, many modifications in addition to those already explicitly described or suggested can be made in the particulars of the above disclosure without departing from the spirit of this invention.

What is claimed is:

1. A machine method of compressing data derived by tracing the contour line of a character or a graphic symbol, characterized by the steps of:
   selecting a plurality of sampling points along the contour line;
   finding the length of a first line segment connecting a sampling point of interest and a preceding sampling point;
   finding the angle defined by the first line segment and a second line segment defined by connecting the sampling point of interest with a following sampling point; and
   determining whether the sampling point of interest is necessary data which needs to be retained or unnecessary data which may be disregarded according to the length of the first line segment and the angle defined by the first and the second line segments.

2. A method of compressing data according to claim 1, wherein the sampling point of interest is determined to be necessary data or not according to the product of the length of the first line segment and the angle defined by the first and the second line segments.

3. A method of compressing data according to claim 2, wherein the sampling point of interest is determined to be as necessary data only when the product of the first line segment and the angle defined by the first and the second line segments is greater than a certain constant value.

4. A method of compressing data according to claim 2, wherein the sampling point of interest is determined to be necessary data only when the product of the length of the first line segment and the angle defined by the first and the second line segments is equal to or greater than a certain constant value.

* * * * *